(12) United States Patent
Liu et al.

(10) Patent No.: US 10,991,967 B2
(45) Date of Patent: Apr. 27, 2021

(54) PREPARATION OF A NEW TYPE OF COMPOSITE ANODE AND MICROBIAL FUEL CELL BASED ON NITROGEN DOPED BIOLOGICAL CARBON AND POROUS VOLCANIC ROCKS

(71) Applicant: Dalian University of Technology, Dalian (CN)

(72) Inventors: Lifen Liu, Dalian (CN); Changfei Gao, Dalian (CN); Jingwen He, Dalian (CN); Yihua Li, Dalian (CN); Liang Li, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 240 days.

(21) Appl. No.: 16/303,541

(22) PCT Filed: Oct. 1, 2017

(86) PCT No.: PCT/CN2017/105199
§ 371 (c)(1),
(2) Date: Nov. 20, 2018

(87) PCT Pub. No.: WO2018/188288
PCT Pub. Date: Oct. 18, 2018

(65) Prior Publication Data
US 2019/0319288 A1    Oct. 17, 2019

(30) Foreign Application Priority Data
Apr. 11, 2017  (CN) .......................... 201710230442.9

(51) Int. Cl.
| | |
|---|---|
| *H01M 8/16* | (2006.01) |
| *C02F 3/12* | (2006.01) |
| *C02F 11/18* | (2006.01) |
| *H01M 4/88* | (2006.01) |
| *H01M 4/96* | (2006.01) |

(52) U.S. Cl.
CPC ............... *H01M 8/16* (2013.01); *C02F 3/121* (2013.01); *C02F 11/18* (2013.01); *H01M 4/8885* (2013.01); *H01M 4/96* (2013.01)

(58) Field of Classification Search
None
See application file for complete search history.

(56) References Cited

FOREIGN PATENT DOCUMENTS

| | | |
|---|---|---|
| CN | 103715402 A | 4/2014 |
| CN | 106207230 A | 12/2016 |
| CN | 106920972 A | 7/2017 |

*Primary Examiner* — Sarah A. Slifka
(74) *Attorney, Agent, or Firm* — Muncy, Geissler, Olds & Lowe, P.C.

(57) ABSTRACT

A preparation method for a novel composite anode based on nitrogen-doped charcoal of sludge and porous volcanic, and a microbial fuel cell, relating to the technical field of resource utilization of new materials, new energy and wastewater. Active sludge is prepared into porous nitrogen-doped charcoal by using a nitrogen high-temperature pyrolysis baking method; and then, surface minerals are removed by using an acidification method to improve the electrical conductivity of the charcoal; finally, surface charcoal loading is performed by taking volcanic granules as a carrier to prepare and form nitrogen-doped charcoal granules on a volcanic surface. The novel granules have high porosity, high electrical conductivity and large specific surface area, and fully meet the performance requirement of the anode material of the microbial fuel cell. The anode of the novel nitrogen-doped porous charcoal can increase the loading capacity of electricity-producing bacteria and microorganisms of the anode of the microbial fuel cell, and improve the conversion rate of biomass energy in wastewater; by virtue of low-resistance characteristics, the electron transfer efficiency is also improved, and finally, the power of the microbial fuel cell is enhanced, so that both wastewater treatment and recycling and efficient biological power generation are achieved.

2 Claims, 1 Drawing Sheet

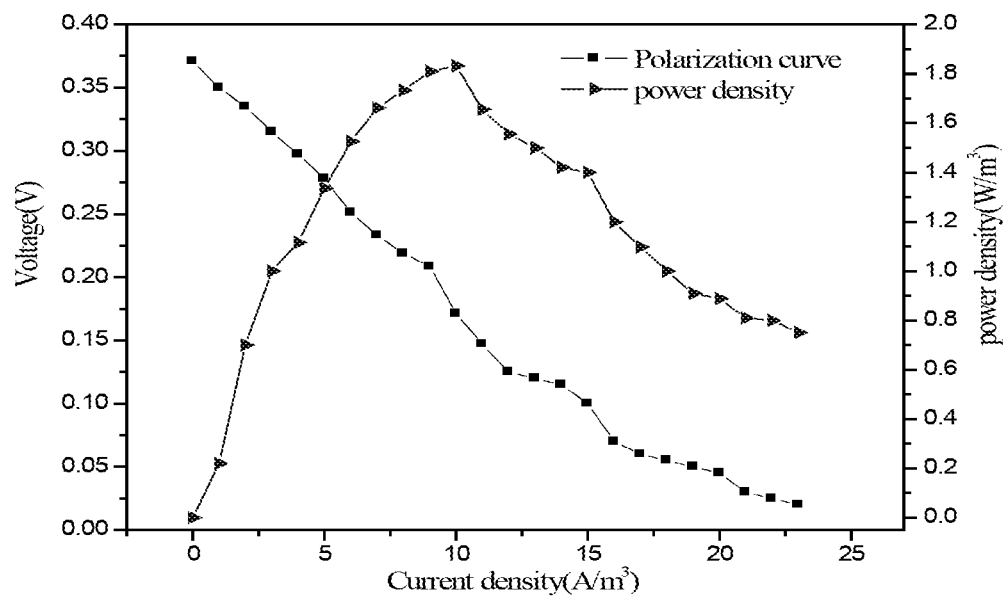
Fig. 1(Fig.1 as an illustration in Abstract)
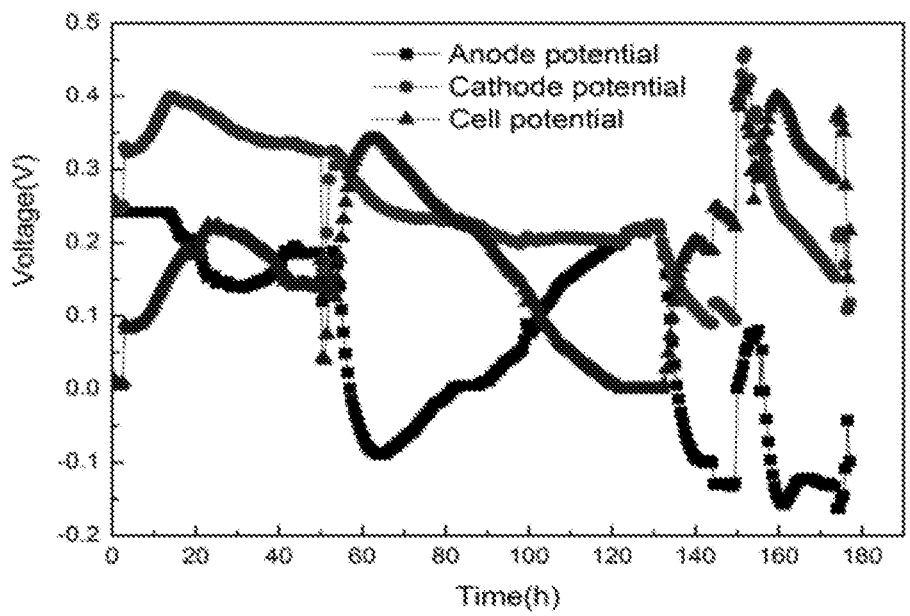
Fig. 2

PREPARATION OF A NEW TYPE OF COMPOSITE ANODE AND MICROBIAL FUEL CELL BASED ON NITROGEN DOPED BIOLOGICAL CARBON AND POROUS VOLCANIC ROCKS

TECHNICAL FIELD

The invention belongs to the technical field of the utilization of new energy and new materials and water resources. The specific research contents are as follows: the first is that activated biological sludge was prepared into porous biological carbon doped nitrogen by nitrogen pyrolysis baking method, and then by acidification method to remove the surface of minerals for enhancing the conductivity of biochar, the biological carbon were loaded on the surface of the volcano rock particles as the carrier at last, so the biological carbon particles doped nitrogen were prepared. These new particles have a lot of advantages, such as high porosity, good conductivity and large surface area, which properties meet the anodic performance requirements of microbial fuel cell. The new biological porous carbon anode doped nitrogen not only can increase attached bacteria and microbial quantity of the anode of microbial fuel cell, but increase biomass conversion rate in wastewater, lower resistance, and improve the electron transfer rate of MFC. The above technical advantages can significantly improve the power of the microbial fuel cell, and realize the wastewater treatment resource and the high efficiency biological electricity production at the same time.

TECHNICAL BACKGROUND

In recent years, MFC technology has attracted wide attention because of the rapid development of new energy technology. Much organic matter are concluded in domestic sewage and industrial wastewater, these water can be used as the source of MFCs. When the wastewater is treated with high quality, the biomass energy in the wastewater is converted into electrical energy, and the clean energy is producted in the process, which is an efficient way to develop new energy. MFC anode directly involved in microbial catalysis, the load directly determines the efficiency of biomass conversion, and the electrode material is the electricigens electron transfer medium, so the particle filled anodic chamber properties obviously plays a decisive role in the fuel cell power generation.

The basic performance requirements of the anode material for MFC are low resistivity, high total porosity and large specific surface area. The commonly used anode materials include carbon cloth, graphite particles, activated carbon particles, graphite rod, graphite felt, carbon brush, graphite disc and so on. These materials have good conductivity, higher surface roughness, suitable electricigens attached and electron transfer. However, with the microbial metabolism and the increase of anodic biofilm thickness, the specific surface area is reduced, and the electron transfer efficiency is significantly reduced, resulting in the rapid reduction of microbial fuel cell potential. At present, the effective way to solve this technical problem is to improve the specific surface area of the anode material and improve the conductive properties of the material. The interface between microorganism and electrode deter mines the speed and amount of electron transfer. Therefore, the interface between microorganism and electrode is more important than the inner space of the electric carrier which is not utilized. The internal carrier of microorganism has little effect on electricity production. The cost of MFC electrode restricts the practical application of the technology. Therefore, the preparation of low-cost anode materials and cathode electrodes is an important content to promote the application of MFCs in water treatment industry. Compared with all kinds of high cost carbon anode materials, the preparetion of the novel cheap biochar based biosludge and surface modification of volcanic material with large pore and solid material is significant for the prepare composite electrodes of cheap carbon and inorganic mineral.

Under the condition of the isolation of oxygen and the filling of nitrogen, the activated biological sludge was made into the novel porous biological carbon doped nitrogen by using high temperature pyrolysis and baking technology, and then the conductivity is improved by acidification. Using self deposition, The prepared carbon materials was loaded on the surface of the carrier volcano rock particles, realizing the preparetion of biochar.

The new MFC anode filling materials with the high specific surface area and good conductivity of the patent can significantly enhance the load of electricigens, the surface of biochar formed by high temperature baking is smooth, easy to fall off biofilms, and promotes the transfer of electrons. It can significantly enhance the cell potential and coulombic efficiency.

SUMMARY OF THE INVENTION

The purpose of this invention is to provide a new type of composite anode doped nitrogen based on sludge biological carbon and porous volcano rocks and MFC, Which can solve the problem of anode low loading rate of microbial electricity, and effectively improve the electron transfer rate of MFC, while traditional MFCs were be plagued by the problem of poor potential stability.

The technical proposal of the invention is:

A new method for the preparation of a novel composite anode doped nitrogen based on the biological carbon and porous volcanic rocks of the sludge, which are as follows:

(1) Activated sludge was dried by vacuum drying at constant temperature. After drying, the sludge was roasted and calcined for 4-6 hours at 600~700 C, and then slowly heated up and nitrogen was added without oxygen, dry powder sludge was prepared;

(2) The obtained dry sludge and more than 50% concentration hydrofluoric acid were mixed, the quality ratio was more than 1:2 of the dry sludge powder and hydrofluoric acid, the mixed powder was removed after stirring 1~3 h, and then washed with deionized water to neutral, porous carbon powder doped nitrogen was made;

(3) After drying at 60 C for 8-12 hours at constant temperature, the porous carbon powder doped nitrogen was taken out for reserve;

(4) The volcanic rock particles with more than 40% porosity were selected for purge and deionized water cleaning;

(5) Using PVDF as binder, PVDF and dry porous obtained carbon powder doped nitrogen were mixed in DMF, and then volcano rock particles were added, so porous carbon powder doped nitrogen was evenly coated on the outer surface of the volcano rock particles after processing and mixing, biochar particles in the core of volcanic rocks were prefabricated by phase inversion method; the particles were baked for 4-6 hours at 600-700° C., nitrogen was inputted while isolated oxygen during the period, new porous carbon particles doped nitrogen were inoculated with *Shewanella*, which was a novel composite anode sludge biological porous carbon doped nitrogen based on volcano rock for the reserve.

The biological carbon doped nitrogen based on porous volcano rock was filled in the anodic chamber of MFC as electrode, the filling rate was 95-100%. Carbon rods were inserted in the novel composite anode porous biological carbon doped nitrogen, and titanium wire on the top of the carbon rods was connected with data collection system. A water inlet was set on the top of anodic chamber, hydraulic transmission was performed using gravity flow model. The gas check valve was arranged at the top end of the anode chamber; the saturated calomel reference electrode was inserted into the biological carbon, which was connected to external data collection system.

The anode chamber and the cathode chamber are designed from top to bottom, the chambers were separated by non-woven fabrics. Activated carbon was used as air cathode catalyst of cathode chamber, PVDF membrane coated on the carbon cloths, connecting with data collection system. The external resistance was connected between the cathode and the anode.

The beneficial effect of the invention is that the new porous biochar anode doped nitrogen and MFC make full use of the abundant carbon source in the sludge using active biosludge as the substrate, to create the innovative self-made porous biological carbon doped nitrogen taking the volcanic rocks as the core adopting the high-temperature pyrolysis and baking method. The new biological carbon was self-deposited on the surface of the core and calcined at high temperature to form porous carbon particles. The designed MFC anode filler can significantly enhance the electricigens loading amount, and solve the problem of low production efficiency of MFC microbial biomass. The surface of biochar formed by calcining at high temperature has high porosity, smooth and low resistivity, which may reduce the electron transfer resistance and improves the potential of cell. The active carbon was used as the catalyst, the oxygen was reduced in the air cathode chamber. The new porous bio carbon anode doped nitrogen was designed as cheap material, which significantly reduced the cost of wastewater treatment equipment, and was suitable for the treatment of high ammonia nitrogen sewage. It could achieve long-term stability effluent quality of the device.

DESCRIPTION OF FIGURES

FIG. 1—The power density and polarization curve of the new type of porous bio carbon doped nitrogen anode of MFC.

In the figure, the abscissa coordinates indicate the current density, the unit is $A/m^3$. The longitudinal coordinate ($Y_{left}$) indicates the cell potential and the unit is V; the ordinate ($Y_{right}$) represents the power density, the unit is $W/m^3$; the square and the triangle represent the polarization curve and the power density curve respectively.

FIG. 2—The cell potential of of the new type of porous bio carbon doped nitrogen anode of MFC.

In the picture, the abscissa coordinates indicate the time, the unit is d, the ordinate represents the electric potential, the unit is V, the square, the dot and the triangle denote the anodic potential, the cathode potential and the battery potential, respectively.

SPECIFIC IMPLEMENTATION METHODS

The specific implementation method of the invention is described in detail in combination with the technical scheme.

The preparation of porous biochar doped nitrogen: 1000 g activated sludge was filtered and dehydrated (filter cake moisture content <50%), and dried in vacuum drying box at constant temperature at 105° C. The drying sample was transferred to a tube furnace, and the nitrogen was inputted but isolated oxygen. The nitrogen entry rate was 300 mL/min, the heating rate was 5° C./min, the temperature was set at 700° C., and the baking time was set to 1 h.

Porous biological carbon doped Nitrogen acidification: bio carbon powder doped nitrogen was mixed with 200 mL hydrofluoric acid (concentration: 50%) and stirred 1 h in magnetic stirrer. The acidified biochar solution was statically sinked 3 h and removed the supernatant. Deionized water was used to clean the biological carbon for some times until neutral (pH=7). The acidified biological carbon was transferred to the vacuum drying box, and dried for 12 h at constant 60° C. After drying, the sample was transferred to a dry dish to be sealed and reserved.

Preparation of porous biochar particles doped nitrogen: 500 g 3-5 mm volcanic rock particles were screened and immersed in deionized water, and then oscillated by ultrasound for 2 h to remove surface dust and impurities, washed 3 times using deionized water. After cleaning, the volcanic rocks were dried at 60° C. in the vacuum drying box for 3 h at constant temperature. The 5% acidified biological carbon powder was stirred with 10% PVDF using DMF as the solvent, and the stirring time was 1 h, and the biological carbon coated solution was made.

With volcanic particles as the core, the particles of volcanic rock were placed in the biofilm solution to stir and hang up the membrane. The uniform particles were taken out and placed in air for 20 s. The phase transformation time was 3 h. The volcanic rocks coated carbon were transferred to the vacuum drying box, and the drying time was 3 h at 105° C. After drying, the biochar particles were transferred to the tube furnace again, and the nitrogen was pumped but isolated oxygen. The nitrogen entry rate was 300 mL/min, the heating rate was 5° C./min, the setting temperature was 700° C., and the baking time was set to 1 h.

MFC assembly: the design size of anode chamber was φ100×100 mm, filled with new porous biochar particles doped nitrogen as anode microorganism filler, and the filling rate was 95%. 6 mm diameter carbon rod was settled in the center of anode chamber, titanium wire on the top of the carbon rod was drawed out the chamber, calomel reference electrode was inserted at the top of the anode chamber, titanium wire and reference electrode were respectively connected to the data collection system. A gas check valve was integrated in the top seal plate of anode chamber.

The anode chamber was connected to the cathode chamber using non-woven fabric as separator. The design size of cathode chamber was φ100×30 mm, filled with activated carbon as cathode catalyst (filling rate: 100%). Carbon fiber cathode was arranged at the bottom of cathodic chamber as air cathode. The carbon fiber wire was used to connect with the data collection system, 1000Ω external resistance was setted between titanium wire and cathode carbon fiber. The anode chamber was inflowed on the top and flowed from the bottom of the anode chamber.

Device performance tests: the anode chamber was inoculated with *Shewanella* electricigens. The wastewater was transported into the anode chamber through the peristaltic pump. After the anode potential was stable, the system was debugged.

After the battery potential was stable, the polarization curve and the power density curve were tested. As shown in FIG. 1 and FIG. 2, the performance test results indicated that the device could significantly improve the cell potential and coulombic efficiency.

The invention claimed is:

1. A preparation method of a composite anode doped nitrogen based on biological carbon and porous volcanic rocks, comprising:
   (1) preparing dry power sludge by drying activated sludge and calcining the activated sludge at 600~700° C. without oxygen;
   (2) making porous carbon powder doped with nitrogen by purifying the dry powder sludge by acidification;
   (3) drying the porous carbon powder doped nitrogen;
   (4) selecting volcanic rock particles with more than 40% porosity for purge and deionized water cleaning;
   (5) using PVDF as binder, mixing PVDF and drying the porous carbon powder doped with nitrogen in DMF, and then adding the volcano rock particles, evenly coating the porous carbon powder doped with nitrogen on outer surface of the volcano rock particles after mixing; then calcining them at 600-700° C. without oxygen, inoculating new porous carbon particles doped with nitrogen with *Shewanella*, which is a composite anode doped with nitrogen based on biochar and porous volcano rocks.

2. A MFC using a composite anode doped with nitrogen based on the biochar and porous volcanic rocks, wherein:
   biochar doped with nitrogen based on porous volcano rock is filled in an anodic chamber of MFC as electrode, a filling rate is 95-100%; carbon rods are inserted in the composite anode porous biochar doped with nitrogen, and titanium wire on a top of the carbon rods is connected with data collection system; a water inlet is set on a top of the anodic chamber, hydraulic transmission is performed using gravity flow model; a gas check valve is arranged at a top end of an anode chamber; a saturated calomel reference electrode is inserted into the biological carbon, which is connected to an external data collection system;
   the anode chamber and a cathode chamber are designed from top to bottom, the chambers are separated by nonwoven fabrics; activated carbon is used as air cathode catalyst of the cathode chamber, PVDF membrane is coated on carbon cloths, connecting with the data collection system; an external resistance is connected between the cathode and the anode.

* * * * *